United States Patent [19]

Sirkin et al.

[11] Patent Number: 5,275,680
[45] Date of Patent: Jan. 4, 1994

[54] METHOD FOR OPTICALLY COUPLING LIQUID CRYSTAL CELLS

[75] Inventors: Eric R. Sirkin, Palo alto; Joseph J. Curry, Los Altos, both of Calif.

[73] Assignee: Apple Computer, Inc., Cupertino, Calif.

[21] Appl. No.: 875,947

[22] Filed: Apr. 30, 1992

[51] Int. Cl.⁵ .............................................. B32B 31/00
[52] U.S. Cl. .................................. 156/277; 156/305; 156/306.3; 156/326; 359/53; 359/74; 428/1
[58] Field of Search ...................... 156/326, 305, 306.3, 156/277; 428/1; 359/53, 74; 252/11

[56] References Cited

U.S. PATENT DOCUMENTS 3,843,764  10/1974  Grawey et al. ...................... 156/329

FOREIGN PATENT DOCUMENTS 63-152688  6/1988  Japan ................................ 156/326

OTHER PUBLICATIONS

"Dow Corning Optigard® Q2-3314 Cable Filler", 1988.
"Dow Corning® 7, 4, and 111 Silicon Compounds", 1988.

Primary Examiner—John J. Gallagher
Attorney, Agent, or Firm—Stuart J. Madsen

[57]  ABSTRACT

A method for bonding together liquid crystal cells using a transparent grease. The grease maintains a level of viscosity appropriate for physically bonding the cells while matching the indices of refraction of the cells or cell layers for proper optical coupling.

4 Claims, 2 Drawing Sheets

METHOD FOR OPTICALLY COUPLING LIQUID CRYSTAL CELLS

BACKGROUND OF THE INVENTION

1. Field of the Invention

The present invention relates generally to liquid crystal displays and more particularly to a method for bonding together liquid crystal cells using a transparent, highly viscous non-curable grease.

2. Brief History of the Art

Many classifications of liquid crystal displays incorporate multiple liquid crystal devices in their fabrication. For example, one such type of device, a double super twist display, is constructed using an active LCD cell and a compensating LCD cell. Another such type of device, a liquid crystal shutter display, is normally constructed using two $\pi$-cells, and, in some applications, a third anti-reflection sheet of glass.

When fabricating these types of displays, it is often desirable to avoid air gaps between the optical elements. Air gaps tend to cause internal reflections and transmission losses which ultimately reduce output image quality. Thus, for these displays, it is highly desirable to place a transparent material between the liquid crystal cells that is matched to the indices of refraction of the bordering optical elements, i.e., the inter-lying polarizing films or glass substrates. The addition of this material effectively eliminates any air gaps and minimizes the internal reflections and transmission losses.

Prevalent contemporary solutions in manufacturing either double super twist nematic liquid crystal or liquid crystal shutter displays which do not leave air gaps between individual cells include applying permanently bonding gels or epoxies between the cells which harden as they cure. Two-part gels and epoxies are commonly used and offer the advantage of permanently sealing the optical elements together, however, their use also prevents several disadvantages.

First, the initial viscosities of these materials prior to cure must be sufficiently low in order to allow good mixing. As a result of this limiting low viscosity, the component parts of the gels or epoxies can readily flow over unwanted surfaces before they have time to solidify. This problem can be avoided if the liquid crystal cells are placed into a mold capable of containing the component parts during the curing process. However, a reusable mold is an inadequate solution because it must be able to release the bonded assembly after the cure without needing to be cleaned. A cleaning procedure after each casting would be prohibitively expensive in a high volume manufacturing process. Additionally, a mold which becomes a permanent part of the display assembly, while eliminating the cleaning problem, still presents added cost and design difficulties.

Additional solutions to optical cell coupling include ultra-violet cured materials and plastic films. Although ultra-violet cured materials offer many theoretical advantages, the transmission properties of the sheet glass and polarizing films as well as the stability of the liquid crystal materials to ultra-violet exposure all prohibit this alternative. Plastic films matching the x-y dimensions of two rectangular liquid cells can function well as the optical coupling material, but both sides of the film must include an adhesive glue layer that binds to the surfaces of the glass and polarizers. These films are prohibitively expensive and difficult to apply without image-deteriorating air bubble defects.

SUMMARY OF THE INVENTION

The present invention comprises a novel method for bonding liquid crystal cells together using a transparent highly viscous non-curable grease. In the preferred embodiment, this grease is applied to the outer surface of a first cell, and a second cell is pressed thereagainst. The grease is effectively sandwiched between the cells and creates a stable non-permanent bond between them. There are presently available greases which are chemically inert and which provide sufficient optical quality to bond the cells together without degrading a transmitted image. This bonding method offers several advantages over contemporary solutions for optically coupling liquid crystal cells described above, and is particularly well suited for liquid crystal display manufacturing lines.

For example, the grease can be easily applied to a cell using well-known roller coating or screen printing technologies to provide a uniform coating over the glass substrate. Because most greases are manufactured with a binder, they maintain their initial consistency over a wide temperature range. Additionally, most greases are chemically inert, which means they are easy to apply while still maintaining the index of refraction matching characteristics necessary to facilitate good image quality. Another substantial benefit is that the greases are premixed which facilitates a manufacturing process which does not have to incorporate a temperature curing step or resolve handling problems related to pot-life.

IN THE DRAWINGS

FIG. 3b is an illustration of the formation of a two cell assembly following the application of the optically transparent grease as shown in FIG. 3a.

DETAILED DESCRIPTION OF THE PREFERRED EMBODIMENT

Many applications of liquid crystal devices require the incorporation of two or more rectangular optical elements in their fabrication. For example, double super twist cells comprise an active LCD cell and a compensating LCD cell, and liquid crystal shutters comprise two $\pi$-cells, often with the addition of an anti-reflection sheet of glass. In each of these applications, in order to achieve maximum output image quality, it is necessary to place an optical coupling material between the two flat rectangular liquid crystal cells. In some cases this optical coupling material comes into direct contact with glass, and in other cases it contacts a polarizer film on the glass.

Figure 1:
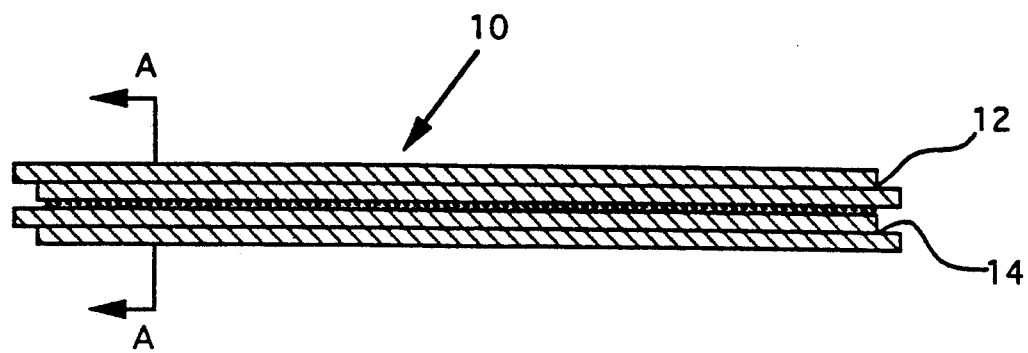
FIG. 1 is an elevational view of a display device incorporating an optically transparent grease in accordance with the method of the present invention.
Figure 2:
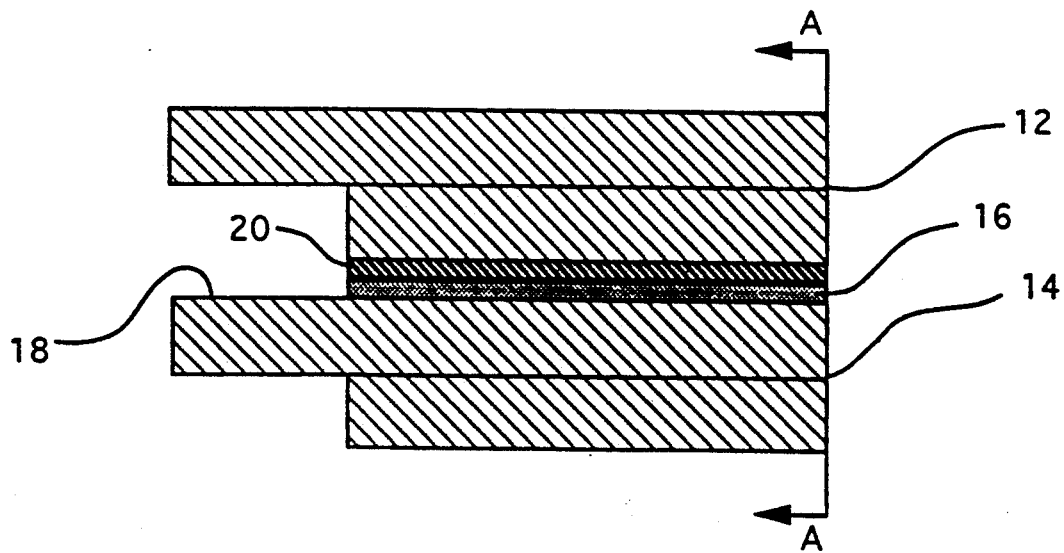
FIG. 2 is an elevational view illustrating an enlargement of a section of the device shown in FIG. 1 taken along the line A—A.

Referring to FIG. 1, shown is an elevational view of an optical assembly 10 for a display device such as the liquid crystal shutter described above. Assembly 10 comprises a first liquid crystal cell 12 coupled to a second liquid crystal cell 14. As shown in greater detail in FIG. 2, cell 14 includes a linear polarizing film 16 which is bonded to its outer interfacing surface 18. Cells 12 and 14, and linear polarizer film 16, are fabricated using techniques well known to those skilled in the art. Also shown in FIG. 2 is an optical coupling grease layer 20. Layer 20 can effectively comprise any grease which maintains the requisite viscosity for effective application to and bonding of the cells, while matching the appropriate predetermined indices of refraction of interlying polarizing film 16 or the glass substrates of cells 12 and 14.

In the preferred embodiment, successful bonding and optical matching are achieved using silicone/silica and polymeric based lubricants and coupling compounds. These silicone/silica based materials are inert and can be fabricated to a viscosity as high as 100,000 cstokes, and have established themselves as protective films for components needing protection from moisture, oxidizing agents, electrical stress, etc. Dow Corning 200 fluid, listed as a dimethylpolysiloxane, is a commercially available chemically inert grease which can be used for the bonding and which maintains a 60,000 cstoke viscosity. Of course, other optical greases or like substances would be appropriate for the bonding process if they maintained the above described functional characteristics.

Figure 3A:
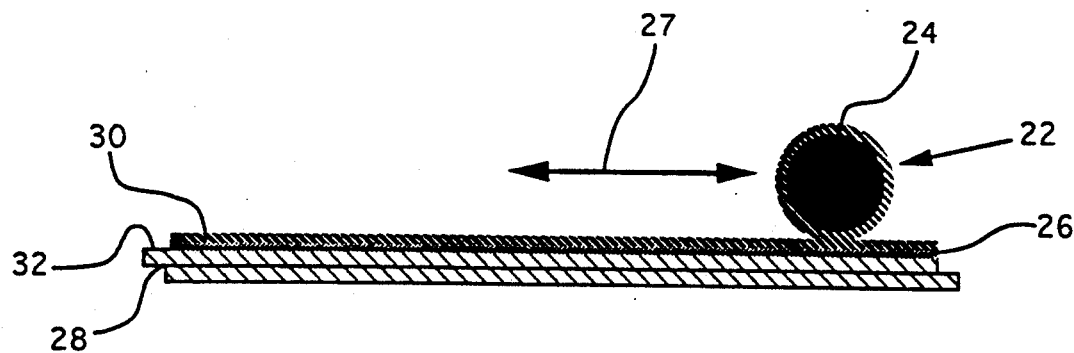
FIG. 3a is an illustration of a preferred method for applying an optically transparent grease to a cell in accordance with the method of the present invention.
Figure 3B:
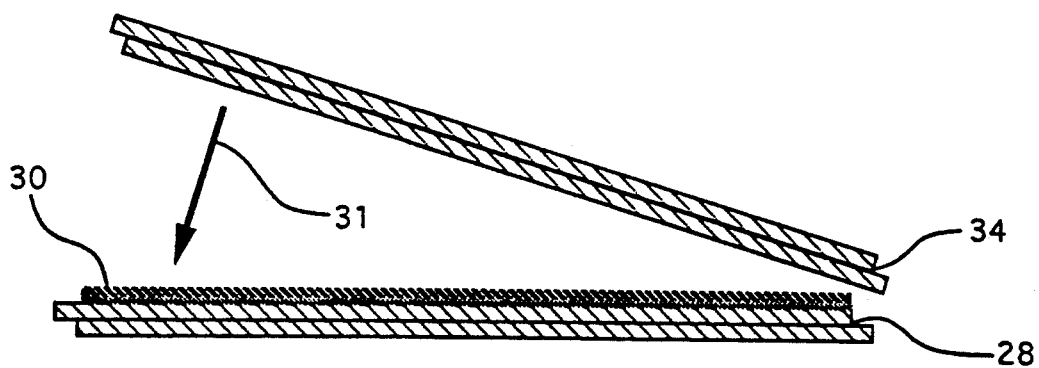

Referring now to FIGS. 3a and 3b, shown is a preferred method of coupling a pair of liquid crystal cells together using the above-described transparent grease in accordance with the present invention. A roller coater 22 is coated with a predetermined amount of grease 24 and is rolled evenly over the bonding surface 26 of a first liquid crystal cell 28 in the directions as indicated by arrow 27. This process is well known in the art and effectively coats surface 26 with a uniform thin optical grease layer 30, typically between 30-150 μm in thickness. As shown in FIG. 3a, surface 26 is actually a linear polarizing layer which is coupled to an outer surface 32 of the glass substrate of cell 28. Of course, in the absence of the linear polarizing layer, optical grease layer 30 could be applied directly to outer surface 32 of the glass substrate.

After roller coater 22 has uniformly coated cell 28 with an even layer of optical grease 30, a second liquid crystal cell 34 is disposed in a predetermined position over layer 30 and the cells are forced together, as indicated by arrow 31. This force bonds the cells together and, thereafter, the surface tension produced by the optical grease layer prevents any inadvertent movement of the cells relative to one another.

Of course, alternative methods of coating and bonding the cells together are contemplated. For example, any dispensing device which is operative to provide an even layer of grease on the cell substrates or polarizing layer would suffice. It has been specifically determined that screenprinting is an excellent method for applying the grease to the cells. Additionally, although air bubbles may present a problem when using the grease, there are well known technologies for de-gassing the grease and applying it in a manner to reduce the formation of bubbles. Bubbles are only a problem during assembly, and, once put together, a bubble free device should remain bubble free. It is also contemplated that oil could be used to provide the requisite bonding and optical coupling. However, it is believed that grease provides a better candidate for the present method due to its higher viscosity and easier use in the manufacturing process.

Whereas the preferred embodiment of the present invention has been described above, it is contemplated that other alternatives and modifications may become apparent to those skilled in the art after having read the above disclosure. It is therefore intended that the appended claims be interpreted as covering all such alterations and modifications as fall within the true spirit and scope of the invention.

What is claimed is:

1. A method for bonding together liquid crystal cells, comprising the steps of:
   (a) applying a layer of optical grease to a first surface of a first said liquid crystal cell, said grease being transparent to visible light, chemically inert, highly viscous and non-curable;
   (b) disposing a second said liquid crystal cell at a predetermined position relative to said first cell; and
   (c) placing a second surface of said second cell into contact with said layer of transparent grease such that said first cell and said second cell are physically and optically coupled thereby.

2. The method of claim 1 wherein said layer of grease is applied using a roller coater to uniformly coat said first surface.

3. The method of claim 1 wherein said layer of grease is uniformly applied to said first surface by the process of screenprinting.

4. The method as recited in claim 1, wherein said second cell is pressed onto said transparent grease.

* * * * *